(12) United States Patent
Rydh et al.

(10) Patent No.: US 7,849,450 B1
(45) Date of Patent: Dec. 7, 2010

(54) DEVICES, METHODS AND COMPUTER PROGRAM PRODUCTS FOR REVERSE EXECUTION OF A SIMULATION

(75) Inventors: Samuel Rydh, Stockholm (SE); Peter S. Magnusson, San Jose, CA (US); Bengt Werner, Åkersberga (SE)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 11/044,722

(22) Filed: Jan. 28, 2005

(51) Int. Cl.
*G06F 9/44* (2006.01)
(52) U.S. Cl. ........................ 717/131; 717/129; 717/130
(58) Field of Classification Search .................. 717/129, 717/130, 131
See application file for complete search history.

(56) References Cited

U.S. PATENT DOCUMENTS

| | | | | |
|---|---|---|---|---|
| 5,146,460 | A * | 9/1992 | Ackerman et al. | 714/33 |
| 5,548,717 | A * | 8/1996 | Wooldridge et al. | 717/124 |
| 5,659,721 | A * | 8/1997 | Shen et al. | 712/228 |
| 5,966,530 | A * | 10/1999 | Shen et al. | 712/244 |
| 6,161,196 | A * | 12/2000 | Tsai | 714/10 |
| 6,983,234 | B1 * | 1/2006 | Hangal et al. | 703/14 |
| 7,039,663 | B1 * | 5/2006 | Federwisch et al. | 707/205 |
| 2005/0050386 | A1 * | 3/2005 | Reinhardt et al. | 714/13 |

OTHER PUBLICATIONS

Feynman, Richard P., Feynman Lectures on Computing, 1996 compilation of course materials for Potentialities and Limitations of Computing Machines, course given @Cal Tech from 1983-1986.

Gill, S., The Diagnosis of Mistakes in Programmes on the EDSAC, 1951, Proceedings of the Royal Society of London,vol. 206A, pp. 538-554.

Zelkowitz, M.V., Reversible Execution, Communications of the ACM vol. 16, No. 9, Sep. 1973, pp. 566.

Teitelbaum, Tim, et al., The Cornell Program Synthesizer: A Syntax-Directed Programming Environment, Communications of the ACM, Sep. 1981, pp. 563-573.

Archer, James E., et al., User Recovery and Reversal in Interactive Systems, ACM Transactions on Programming Languages and Systems, vol. 6, No. 1, Jan. 1984, pp. 1-19.

Akgul, Tankut et al., Assembly Instruction Level Reverse Execution for Debugging, ACM Transactions on Software Engineering and Methodology, vol. 13, Issue 2, Apr. 2004, pp. 149-198.

Feldman, Stuart I. Feldman et al., IGOR: A System for Program Debugging via Reversible Execution, Proceedings of the 1988 ACM SIGPLAN/SIGOPS Workshop, Nov. 1988, pp. 112-123.

(Continued)

*Primary Examiner*—Wei Y Zhen
*Assistant Examiner*—Matthew J Brophy
(74) *Attorney, Agent, or Firm*—Harness, Dickey & Pierce, P.L.C.

(57) ABSTRACT

Devices, methods, and software program products for reverse execution of a simulation and/or tracing a value are provided. A state of a preceding checkpoint may be restored and a simulation may be run forward. Break points or watch points may be noted and the state of the last occurring breakpoint or watch point preceding the current simulation position may be restored. If no breakpoint or watch point occurred, an earlier checkpoint may be loaded and the previous steps may be repeated.

57 Claims, 9 Drawing Sheets

OTHER PUBLICATIONS

Pan, Douglas Z., et al., Supporting Reverse Execution of Parallel Programs, Proceedings of the 1988 ACM SIGPLAN and SIGOPS Workshop, pp. 124-129.

King, Samuel T., et al., Debugging Operating Systems With Time-Traveling Virtual Machines, University of Michigan CSE-TR-495-04, Aug. 2004, pp. 1-14.

Xu, Min et al., A "Flight Data Recorder" for Enabling Full-system Multiprocessor Deterministic Replay, Computer Sciences Dept. & ECE Dept., Univ. of Wisconsin-Madison, Jun. 2003.

Using Simics in Research & Development, A collection of potential uses for Simics in research and development of advanced digital computer systems, Virtutech White Paper, Oct. 17, 2002.

Introduction to Simics Full-System Simulator Without Equal, Virtutech White Paper, Jul. 8, 2002.

Smith, James E., et al., "Virtual Machines, Versatile Platforms for Systems and Processes," Elsevier, Inc., 2005.

* cited by examiner

DEVICES, METHODS AND COMPUTER PROGRAM PRODUCTS FOR REVERSE EXECUTION OF A SIMULATION

TECHNICAL FIELD

Example embodiments of the present invention are related to computer debugging, software development, and/or value tracing.

BACKGROUND OF INVENTION

Writing computer software completely free of bugs and related problems may be difficult. For example, it may be more difficult to determine that a problem exists because the problem (e.g., a bug) may occur under specific circumstances. In another example, it may be difficult to reproduce a situation, which may lead to the occurrence of the problem (e.g., bug).

Conventional debugging techniques (e.g., to debug software) may include conventional debuggers, tracing, runtime supervision, reverse execution and simulators.

Some bugs may produce effects, which may appear indirectly, for example, a substantially long time after the code containing the bug may have been executed. The effects of such a bug may be observed, however, determining the origin of the effects (i.e., the location of the bug) may not be clear at that time.

Random memory corruption may be an example of such a bug. Software may conventionally run in one direction, for example, forward. A conventional approach to determining the origin of the effects of the bug may be to rerun the software and stop processing prior to the end (i.e., at an earlier point) and analyze possible causes of the problem (e.g., the bug). However, this may be time consuming and may not produce the desired results, for example, due to the erratic behavior of software, the complexity of modern computers, and the difficulty in the reproduction of hardware and/or software states. Determining at what point to stop the processing may also be difficult.

A conventional reversible computer may run calculations both forward and backward. In conventional reversible logic, the computer may not discard information, and thus may be symmetrical in time.

In conventional debugging, both the trace (i.e., the output of events of interest) and the post mortem dump (i.e., or core dump, or "dump" of the raw state of the computer at the time of an error) may be defined. Core dumps may be interactive, in that a program (e.g., a debugger) may freeze and inspect another program (e.g., the program being debugged).

A conventional reverse computation (e.g., using a computer) method may back up execution of the program to a point of the error after it may be noticed and re-execute the program under control of a diagnostic routine. For example, tracing the programming language and the compiler may be leveraged to track a necessary state for reversing some arbitrary execution. This may be done in various ways; for example, software may be augmented with instructions for gathering data sufficient to reverse out of any computation or decision.

Reverse execution may reverse the state of the system in time without manual, time consuming, stop-debug-restart cycles. Conventional reverse execution has been limited to smaller parts of the system (e.g. the state of a single program).

One example of conventional reverse execution is instruction-level reverse execution. In conventional instruction-level reverse execution, executed code may be analyzed and a reverse program, which may undo the effect of forward execution, may be generated.

Conventional methods may reverse execute individual and/or parallel programs, and may use a virtual machine to do so.

SUMMARY OF THE INVENTION

In an example embodiment of the method, according to the present invention, a state of a preceding checkpoint, relative to a current simulation position, may be restored. A simulation may run forward from the preceding checkpoint by replaying recorded events, and the recorded events include non-deterministic events. Break points and/or watch points are noted, and when the current simulation position is reached, the state of the last occurring breakpoint and/or watch point preceding the current simulation position is restored. If no breakpoint and/or watch point has occurred, the state of an earlier checkpoint is loaded, and the previous steps are repeated.

In another example embodiment of the present invention, a device may perform reverse execution of a simulation. An example embodiment of the device may be supported by at least one simulation platform. An example embodiment of the device may include a processor adapted to:

a) restore a state of a preceding checkpoint relative to a current simulation position,
b) simulate forward from the preceding checkpoint by replaying recorded events, the recorded events including non-deterministic events,
c) note break points or watch points,
d) when having reached the current simulation position, restore the state of the last occurring breakpoint or watch point preceding the current simulation position, and
e) if no breakpoint or watch point occurred, load the state of an earlier checkpoint, followed by repeating the previous steps.

Another example embodiment of the present invention provides a software development tool.

Another example embodiment of the present invention provides a method for reverse execution of a simulation.

Another example embodiment of the present invention may provide a software debugger.

Another example embodiment of the present invention provides a software debugging method.

Another example embodiment of the present invention provides a software development support method.

Another example embodiment of the present invention provides a device, which may trace a value of a variable in a simulation.

Another example embodiment of the present invention provides a method for tracing a value of a variable in a simulation.

Another example embodiment of the present invention provides a computer program product, including software code portions for performing an example embodiment the method for reverse execution of a simulation.

Another example embodiment of the present invention provides a computer program product, including software code portions for performing an example embodiment of the software debugging method.

Another example embodiment of the present invention provides a computer program product loadable into the internal memory of a computer, including software code portions for performing an example embodiment of the software development support method.

Another example embodiment of the present invention provides a computer program product, including software code portions for performing an example embodiment of the method for tracing a value of a variable in a simulation.

Another example embodiment of the present invention provides a software debugger comprising the device according to an example embodiment of the present invention.

Another example embodiment of the present invention provides a method for reverse execution of a simulation.

Another example embodiment of the present invention provides a software debugging method.

Another example embodiment of the present invention provides a software development support method.

Another example embodiment of the present invention provides a method for tracing a value of a variable in a simulation.

Another example embodiment of the present invention provides a computer program product, comprising software code portions for performing the method for reverse execution of a simulation according to an example embodiment of the present invention.

Another example embodiment of the present invention provides a computer program product, comprising software code portions for performing the software debugging method according to an example embodiment of the present invention.

Another example embodiment of the present invention provides a computer program product loadable into the internal memory of a computer, comprising software code portions for performing a software development support method according to the seventh aspect. Due to similarities with the method as disclosed under the seventh aspect, reference to the above is hereby made.

Another example embodiment of the present invention provides a computer program product, includes software code portions for performing a method for tracing a value of a variable in a simulation according to an example embodiment of the present invention.

In another example embodiment of the present invention, a software development tool includes the device according to an example embodiment of the present invention.

In another example embodiment of the present invention, a device for tracing a value of a variable in a simulation comprising the device according to an example embodiment of the present invention. In example embodiments of the present invention, a device may include a processor. The processor monitors one or more variables, or parameters of the simulation to be traced. This offers the advantage of being able to trace the origin of a particular value.

Example embodiments of the device may also include at least one target object associated with the simulation platform. The simulation platform may embed the at least one target object and may include at least one hardware model for the simulation. Each hardware model models at least one functional interface relative to the at least one target object. The at least one target object presents at least one functional interface relative to the simulation platform. The at least one hardware model interfaces the at least one functional interface of the at least one target object. The device may further include a plurality of checkpoints. Each checkpoint may represent the state of the simulation at least in terms of the at least one functional interface relative to the at least one target object and a point in time.

In example embodiments of the present invention, a processor may generate checkpoints to note breakpoints or watch points.

In example embodiments of the present invention, the processor may note simulated points in time to note breakpoints or watch points.

In example embodiments of the present invention, the processor may load the state of a preceding checkpoint and simulate forward to the breakpoint or watch point in order to restore the last occurring breakpoint or watch point.

In example embodiments of the present invention, the processor loads a state of a checkpoint corresponding to the breakpoint or watch point to restore the last occurring breakpoint or watch point.

In example embodiments of the present invention, the processor generates a checkpoint.

In example embodiments of the present invention, the processor generates a checkpoint by:
   a. Marking a memory page with an indicator;
   b. Copying the memory page;
   c. Adding the memory page to a preceding checkpoint; and
   d. Remarking the memory page with another indicator.

In example embodiments of the present invention, the generating of a checkpoint is prompted by a user.

In example embodiments of the present invention, the generating of a checkpoint is prompted by the processor. It may be based on a time interval, which may be set and/or adjustable by a user.

In example embodiments of the present invention, in the case of a number of checkpoints having been exceeded, the processor performs at least one the following actions:
   deleting a checkpoint;
   merging checkpoints;
   swapping checkpoints between a first and a second memory;
   compressing checkpoints; and
   stopping generating checkpoints.

In example embodiments of the present invention, one or more target objects include at least one of one or more computer programs, electronic hardware, or a combination thereof.

In example embodiments of the present invention, the one or more computer programs include a client program, an application program, a driver, an operating system program, graphics display program, routing program, communication program, firmware and BIOS.

In example embodiments of the present invention, electronic hardware includes a processor, a bus, a memory (e.g. Random Access Memory (RAM), and hard disk), and a router.

In example embodiments of the present invention, the processor generates a go to checkpoint.

In example embodiments of the present invention, the processor may fast forward, for example, skip forward to a checkpoint.

In example embodiments of the present invention, the processor may rewind, for example, the processor restores the state of the simulation at a simulated time by restoring a checkpoint preceding the simulated time, followed by simulating forward to the simulated time.

In example embodiments of the present invention, the device includes one or more simulation platforms.

In example embodiments of the present invention, the device further includes a micro checkpoint. A micro checkpoint together with the current simulation state and preceding micro checkpoints represent a state of the simulation at a time, at least in terms of a selection of at least one functional interface relative to the at least one target object.

In example embodiments of the present invention, the device further includes a partial checkpoint, representing a state of the simulation at least in terms of a selection of the at least one functional interface relative to the at least one target object and a point in time.

In example embodiments of the present invention, the processor allows more than one state at a point in time and the processor simulates forward based on an indication received from a user. The indication may indicate from which one, or ones, to simulate forward.

In example embodiments of the present invention, the device further includes a conditional break point.

In example embodiments of the present invention, a user is prompted to indicate the one or more variables, or parameters, to be traced.

BRIEF DESCRIPTIONS OF DRAWINGS

DETAILED DESCRIPTION OF THE EXAMPLE EMBODIMENTS OF THE PRESENT INVENTION

Figure 2:
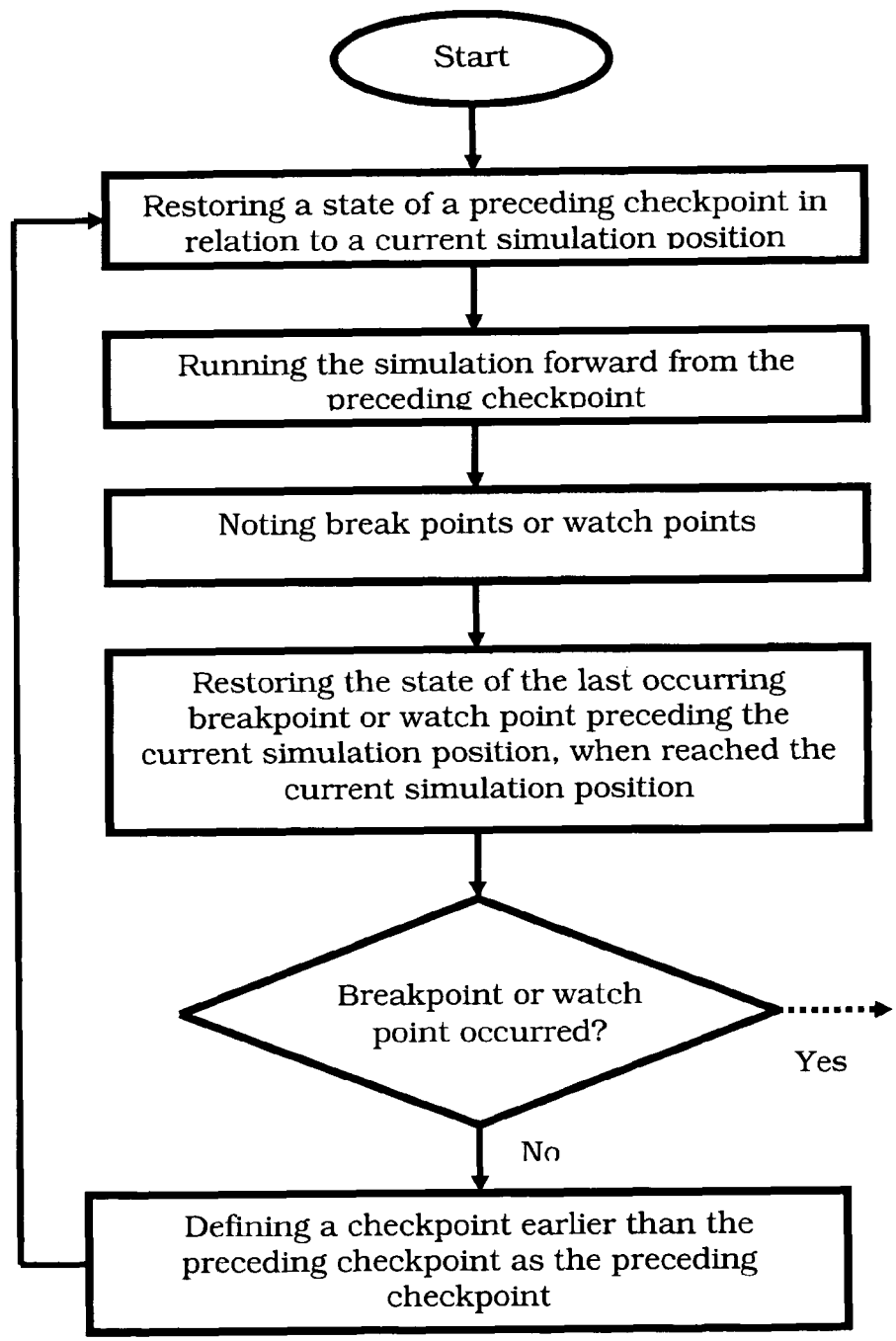
FIG. 2 illustrates an example embodiment of a method for reverse execution according to the present invention.
Figure 3:
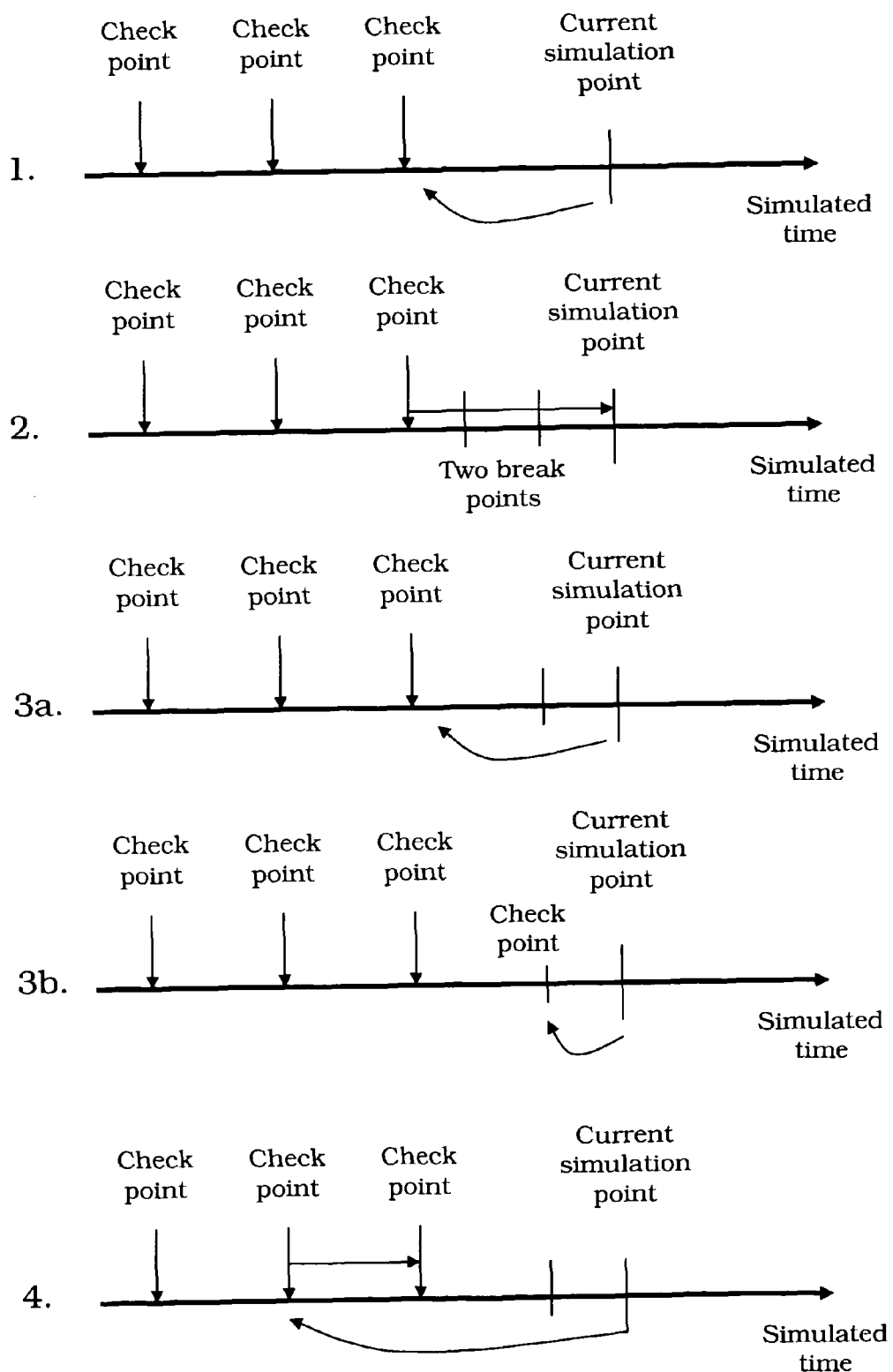
FIG. 3 illustrates an alternative representation of an example embodiment of the method for reverse execution according to the present invention.

An example embodiment of the method for reverse simulation is illustrated in FIGS. 2 and 3. In an example embodiment of the method, a state of a preceding checkpoint, relative to a current simulation position, may be restored. A simulation runs forward from the preceding checkpoint by replaying recorded events, and the recorded events include non-deterministic events. Break points and/or watch points are noted, and when the current simulation position is reached, the state of the last occurring breakpoint and/or watch point preceding the current simulation position is restored. If no breakpoint and/or watch point has occurred, the state of an earlier checkpoint is loaded, and the previous steps may be repeated.

Figure 1:
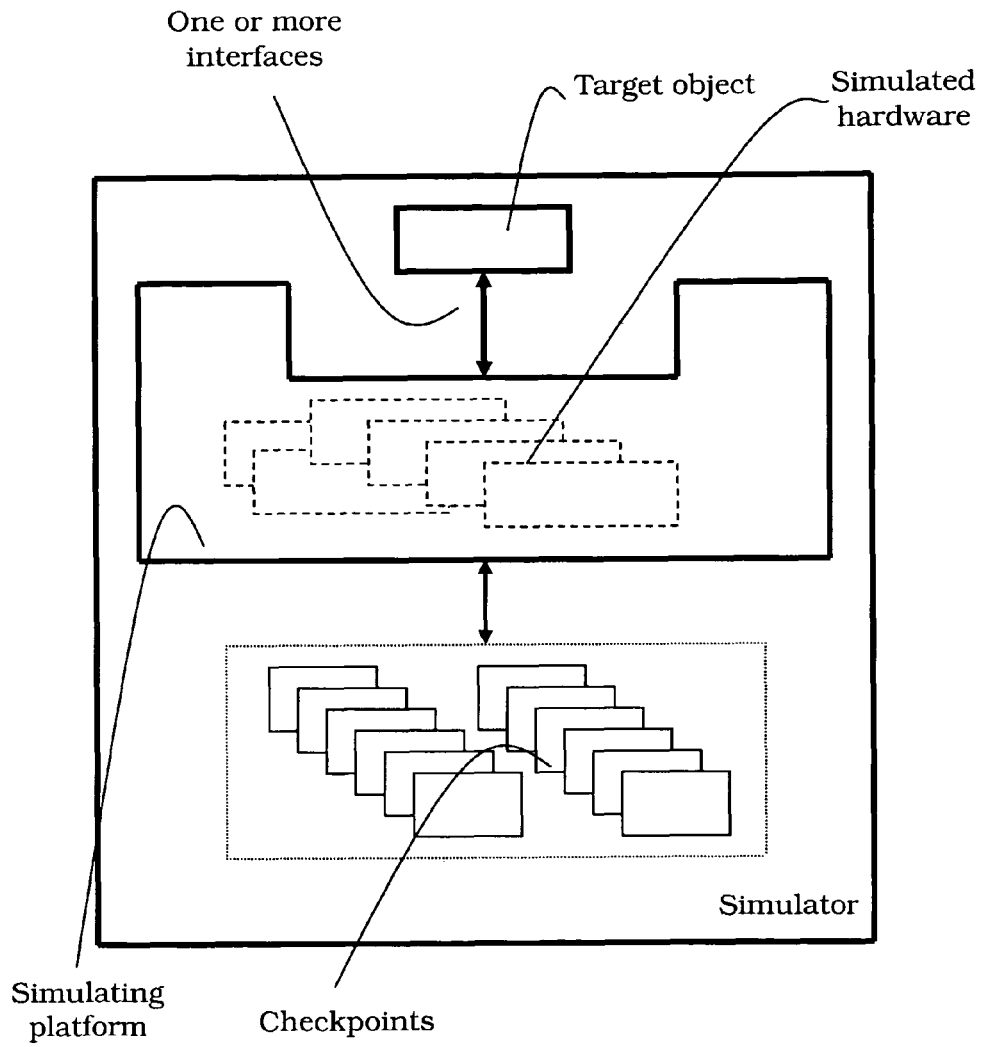
FIG. 1 illustrates the relations between a simulator, a simulating platform, a target object, checkpoints, and interfaces.

An example embodiment for reverse execution of a simulation system will be discussed with respect to FIG. 1.

When the simulated system is running forward in time, micro checkpoints are periodically taken. A micro checkpoint may be a snapshot of the state of the simulation, which may not (initially) contain state information of memory-like objects, for example, RAM, mass storage device media, or any other memory-like objects. Exclusion of these memory-like objects provides micro checkpoints, which may have reduced size (e.g., several orders of magnitude smaller). Non-deterministic events that occur during the simulation (e.g. a human typing on a terminal or incoming external network traffic) are recorded.

The simulation is run backward through utilization of the following steps, which are illustrated in FIGS. 2 and 3, and discussed above.

1) The state of a preceding micro checkpoint is restored, and the micro checkpoint may contain state information sufficient to back (e.g., completely back) the system to that particular time (i.e., a preceding micro checkpoint).

2) The simulation is run forward, recorded events are replayed, and the occurrence of breakpoints, watch points, etc. are recorded, for example, by taking micro checkpoints or by noting the simulated time.

3) When the starting point is reached, the state of the simulation at the last occurring breakpoint is recovered, for example, by loading the state of a preceding micro checkpoint and continuing forward till the last breakpoint; or loading the state of a corresponding micro checkpoint.

4) If no breakpoints have occurred, an earlier micro checkpoint is loaded and the process is repeated.

The state of memory-like objects are represented by a number of pages. An individual page may represent, for example, a disk sector in a mass storage device or a physical RAM page, for example, when simulating a DIMM memory module. Each time a micro checkpoint is taken, all, or substantially all, pages are marked as clean. When a clean page is to be modified, a copy of it is added to the preceding micro checkpoint, and the page is marked as "dirty", or modified.

Figure 4:
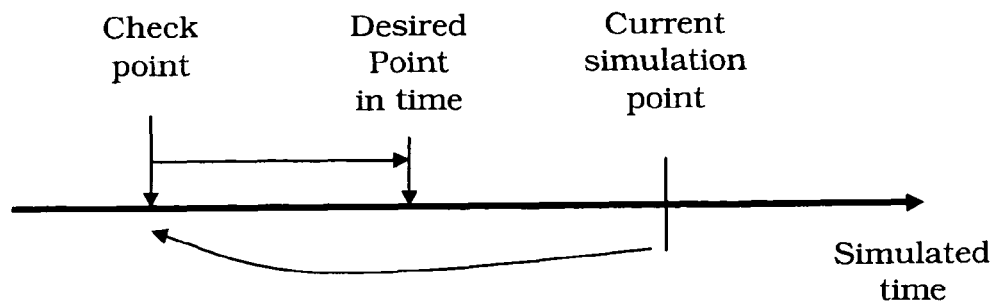
FIG. 4 illustrates another example embodiment of the present invention in which a checkpoint may go to a simulated time.

In example embodiments, rewind functionality may be implemented. Rewind functionality restores the state of the simulation at a specified simulated time by restoring a preceding micro checkpoint and running forward till the specified point as is illustrated in FIG. 4.

When the state of the simulation is restored from a micro checkpoint, all intermediate micro checkpoints in between it and the current position are examined. For memory-like objects, the oldest instance of all pages describing a particular part of the object is used to restore its state. Pages that are not present in any checkpoint do not need to be restored since they haven't been altered. The state of non-memory objects is restored from the selected micro checkpoint.

In example embodiments of the present invention, the state collection policy may be an algorithm, which decides when micro checkpoints are taken, deleted or merged. Taking a micro checkpoint is, for example, typically in the order of a few milliseconds since the bulk of the data is not included. Merging two consecutive micro checkpoints is also relatively fast, for example, similar, or substantially similar, to the time for taking a micro checkpoint. The merging may be done as follows:

Let A and B be two consecutive micro checkpoints where A is older than B. Let C be the resulting micro checkpoint which replaces A and B.

1) state information of non-memory objects present in A is added to C;

2) all pages in A are added to C;

3) pages in B that are not also present in A are added to C.

The result is that C will contain the oldest state information.

A copy-on-write overhead, that is, the copying and the extra resource utilization associated with storing the copies in memory, for example, may increase the frequency at which the micro checkpoints are taken.

Different state collection policies may have different forward and reverse simulation performance. For example:

1) micro checkpoints are taken periodically; when the number of checkpoints exceeds a specified limit, the oldest one is merged (or deleted);
2) micro checkpoints are taken periodically; when the number of checkpoints exceeds a specified limit, the pair of consecutive checkpoints that are closest in simulated time (or in some other metric) are deleted;
3) a single micro checkpoint is taken at the beginning of the simulation (or at some other time); and/or
4) the user creates micro checkpoints by hand.

The above policies are examples which may be combined with each other and with optional policies (e.g., resource limitation policies), for example:

1) old checkpoints are deleted;
2) checkpoints are merged if some specified limit (e.g., RAM usage) is exceeded;
3) checkpoints are swapped out from memory to disk if some limit is exceeded;
4) checkpoints are compressed if a criteria is satisfied (e.g., specified time period); and/or
5) future checkpoints are discarded.

The generic state collection mechanism may be combined with more specialized algorithms focused on increasing interactivity. For example, the addition of a micro checkpoint close, or substantially close, to the target of a rewind operation may increase the speed of future reverse operations. In another example micro checkpoints may be taken at breakpoints.

In example embodiments of the present invention, the method described above and illustrated in FIGS. 2 and 3 may be used in connection with reversible network traffic. For example, multiple network nodes are simulated along with the links included in the network, that is, a general message passing fabric. In this example embodiment, reversible execution is applied to reversible network traffic, and messages sent between network nodes will be unsent if the simulation is reversed.

Figure 5:
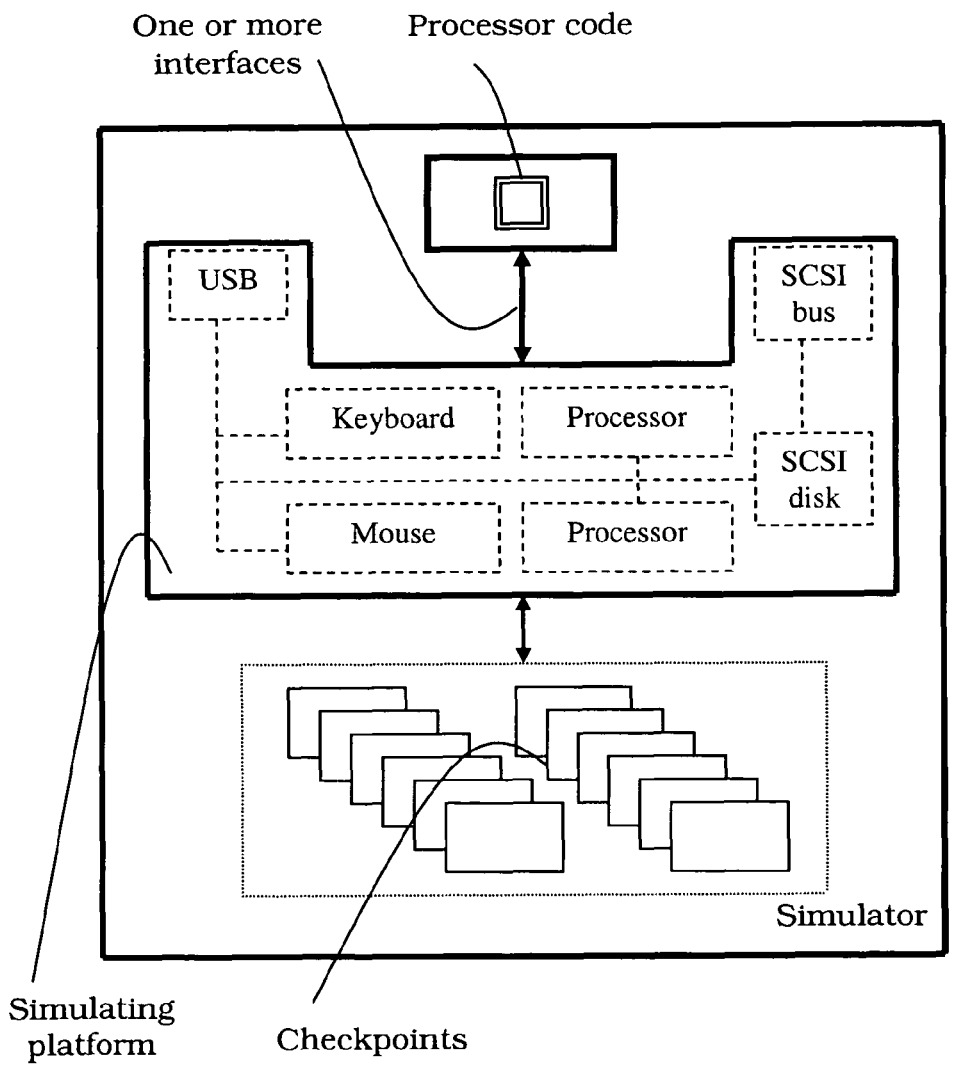
FIG. 5 illustrates another example embodiment of the present invention, in which a PC is simulated.

With regard to FIG. 5, another example embodiment of the present invention, employing the method described above and illustrated in FIGS. 2 and 3, provides reverse execution of a system simulator simulating a PC machine. The dashed lines and boxes in FIG. 5 may indicate simulated components and/or interfaces.

A typical simulator set up may be, for example, a modeled PC (e.g., a dual-processor variant) connected to a set of modeled peripheral devices. The simulated components may be:
two processors;
a PCI host bridge;
a southbridge;
RAM;
non-volatile RAM;
ROM with BIOS;
an IDE disk;
a PCI SCSI•RAID•controller;
a SCSI bus;
SCSI disks;
a PCI ethernet adapter;
an 1000 Mbps ethernet network;
a USB hub;
a USB keyboard and a mouse;
an AGP graphics card; and
a monitor.

Although example embodiments of the present invention have been described with respect to the above simulated components, it will be understood that the above devices are examples and any other suitable devices may be simulated. The model may also include other minor chips and devices normally present in a PC.

Since the system is simulated, the simulator will be able to boot an unmodified operating system from the simulated IDE disk and run arbitrary software. The simulator is attached to a frontend through which the simulation may be controlled. There is also a software debugger which may or may not be integrated with the frontend. The well known gdb debugger is an example of a stand alone software debugger suitable for use with a simulator.

There may also be other kinds of debuggers integrated with the simulator. For instance, a specialized debugger or debugging module could be focused on the SCSI bus and the commands sent through it.

The simulator itself might be running on a single workstation or be a distributed over several workstations (i.e., each node would typically simulate a single CPU but other partitions may also be feasible).

The reverse execution functionality may be integrated with the simulator itself, and the simulated objects may have three basic properties, for example,
a) be memory-like,
b) have state information which is not memory-like, and
c) have an interactive or otherwise non deterministic behavior.

In this example setup, the RAM, the ROM and the non-volatile RAM as well as the hard disks and the video RAM have property a), although a simulated component may have both properties a) and b) simultaneously. The SCSI disks, for example, have a memory-like state (e.g., all, or substantially all, the data on the medium) as well as other state such as queued disk operations and/or error results. The mouse and keyboard are examples of interactive objects, although they have state information, for example, currently pressed keys.

The memory-like state information is organized in the form of pages where each page represents an amount of memory. For example, a page size may be 4K for RAM and 4K for a disk. The page size may depend on usage patterns. RAM may be accessed through the MMU so the MMU page size may be used for RAM. The block size for disks depends on which the file system is being used.

During forward simulation, micro checkpoints are taken periodically. Micro checkpoints do not contain any memory-like state information. A newly taken micro checkpoint may contain a snapshot of the state of the two CPUs (e.g., the CPU registers) and a snapshot of, for example, all, or substantially all, device registers, buffers, in-flight commands, etc. That is, a newly taken micro checkpoint will reflect the state of the simulation without memory-like state information. Interactive input is recorded (i.e. the simulated time and the event itself is stored).

Assuming that a micro checkpoint B is taken after micro checkpoint A, and that the following occurs between A and B (in addition to the state information that is initially included in the micro checkpoint):
RAM page #1319 is modified
RAM page #1333 is modified
a key on the simulated USB keyboard is pressed
disk page #15699 is modified At time t_A, the contents of A are 'the device state'. When a particular memory page is initially modified in between t_A and t_B, a copy of the unmodified page is added to micro checkpoint A, and the contents of A at t_B are:
device state;
RAM page #1319;
RAM page #1333;

disk page #15699; and recorded key event.

The recorded key press is also added to the micro checkpoint A. The micro checkpoint A contains sufficient state information to allow the simulator to rewind the state of the simulation to that at t_A from any time between t_A and t_B. It also contains enough state information to allow playback of non-deterministic events occurring in this interval (e.g., the key press). The simulator is designed to be deterministic (e.g., when all non-deterministic user-input is replayed), so any state in between t_A and t_B may be reproduced by simulating forward from t_A.

From the users point of view, the simulator is capable of backward simulation which may be used in software development and debugging. However, it may also be used for other things; for example, if a particular device misbehaves, the backward simulation can be run, and determine exactly what triggered the misbehavior.

Figure 6:
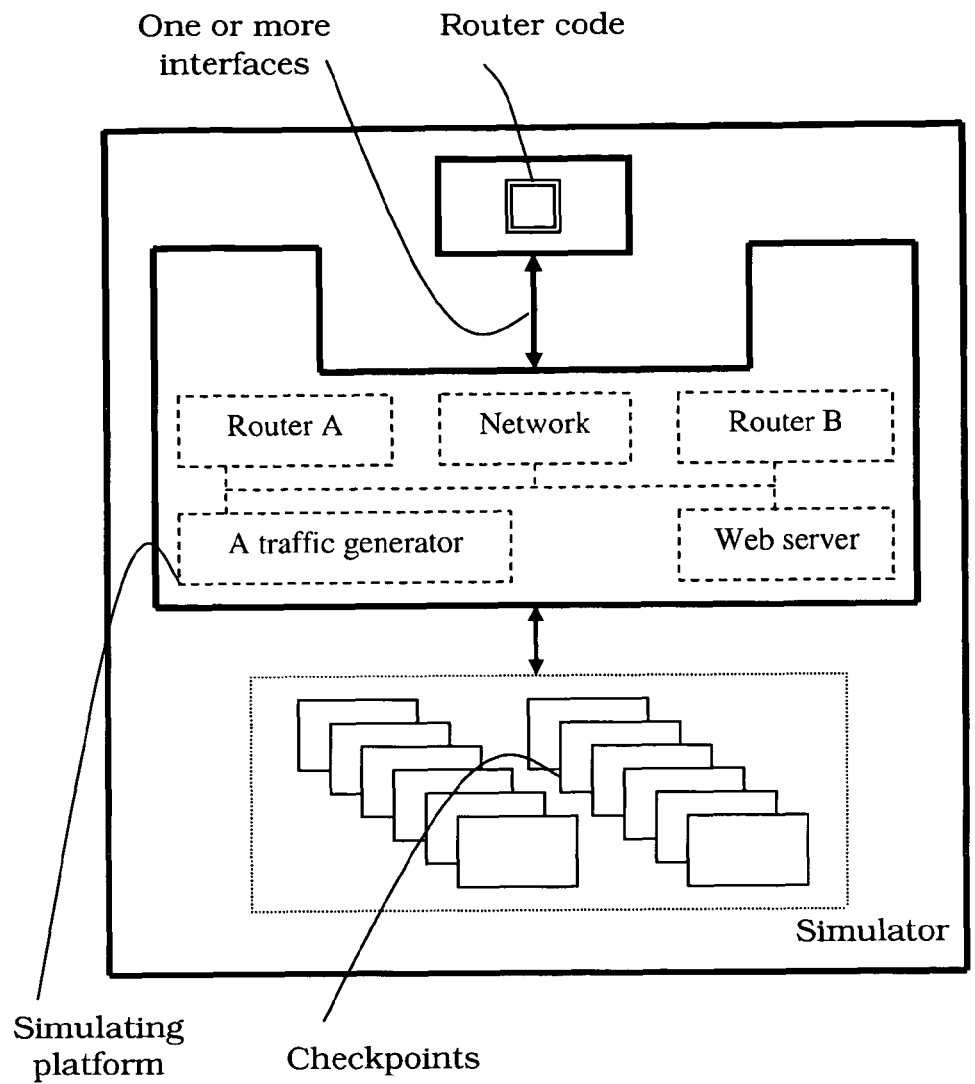
FIG. 6 illustrates another example embodiment of the present invention including a two-router simulator setup.

With regard to FIG. 6, another example embodiment of the present invention, employing the method discussed above and shown in FIGS. 2 and 3, may be implemented on two routers, router A and router B.

As illustrated in FIG. 6, this example embodiment may include:

an Ethernet network (e.g., 1000 Mbps ethernet network);

two routers connected to the network;

a traffic generator connected to the network; and a web server connected to the network.

Depending on intended usage, the level at which the simulation is performed may vary. If the part of interest is the software running on the routers, then a model of the routers (including all components there within) would be appropriate while the web server simulation may not include a model of the hardware it runs upon.

Hardware capable of running an operating system and the web server software may be modeled, and the functional behavior of the routers may be included in the simulation.

Reverse execution capability to this system in the same, or substantially the same, manner as in the single PC case.

Figure 7:
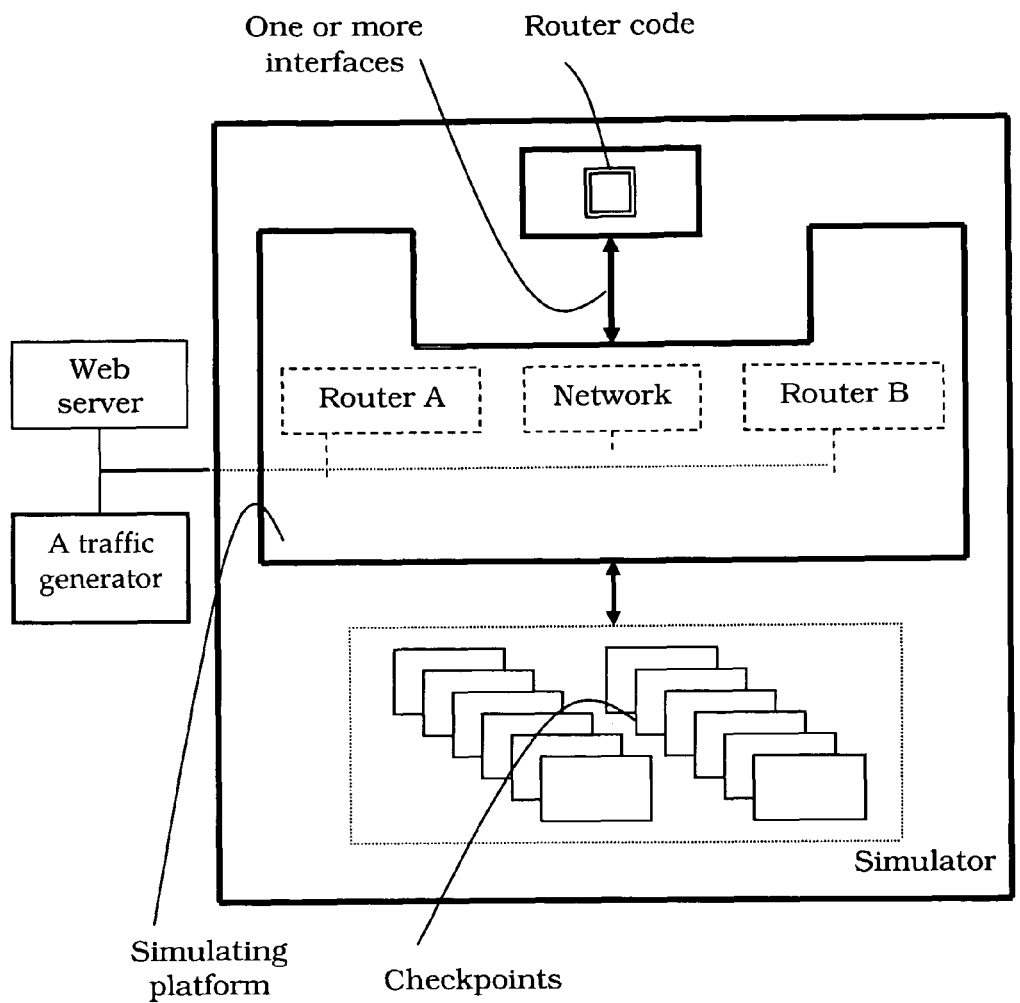
FIG. 7 illustrates another example embodiment of the present invention including a two-router simulator setup in a live environment.

With regard to FIG. 7, another example embodiment, employing the method discussed above and shown in FIGS. 2 and 3, may be implemented on two routers in a live environment. A part of the system may be simulated, and the simulation may interact with unsimulated, or real, components. The following example embodiment (based on the example with two routers of FIG. 7) is an example of this. The setup includes the following:

a physical ethernet network;

2 simulated routers connected to the network;

a web server connected to the network; and a traffic generator connected to the network.

The simulation of the routers may either be performed on a single workstation or distributed on multiple hosts. The ethernet network, the web server and the traffic generator may be physical components and not simulated.

During forward execution, the state of the routers is periodically saved in micro checkpoints. The state of the web server or the traffic generator is not checkpointed since these components in general may lack support for this operation, however, physically existing hardware may have support for checkpointing.

Ethernet packets traversing the boundary of the simulated system into the simulator are recorded. This includes all, or substantially all, network packets originating from the web server and/or the traffic generator.

System reversal is achieved in a similar, or substantially similar, manner as previously:

the state of the routers are restored to that of a preceding micro checkpoint;

during forward simulation, all, or substantially all, network packets originating from the routers are discarded;

all, or substantially all, packets from the web server and/or the traffic generator are discarded; and the packets previously recorded are played back at exactly the same simulated time as when they were received.

The state of the routers may be rewound to a micro checkpoint and simulated forward reproducing the same, or substantially the same, states (of the routers) as in the previous run when the micro checkpoints were recorded.

The simulation may be continued past the simulated time point where reversal was first initiated.

Figure 8A:
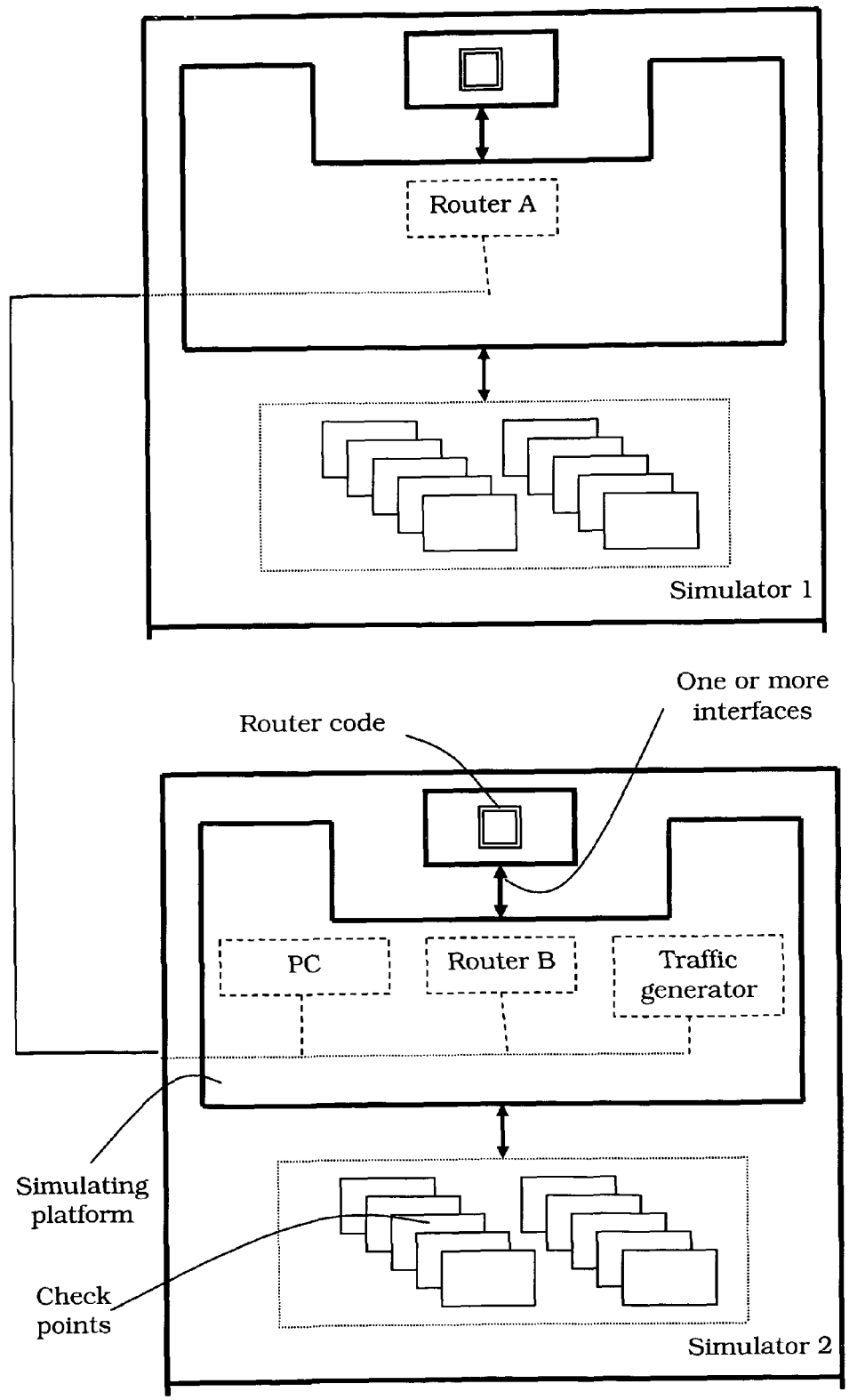
FIGS. 8A and 8B illustrate an example embodiment in which a two-router setup may be partially reversed.
Figure 8B:
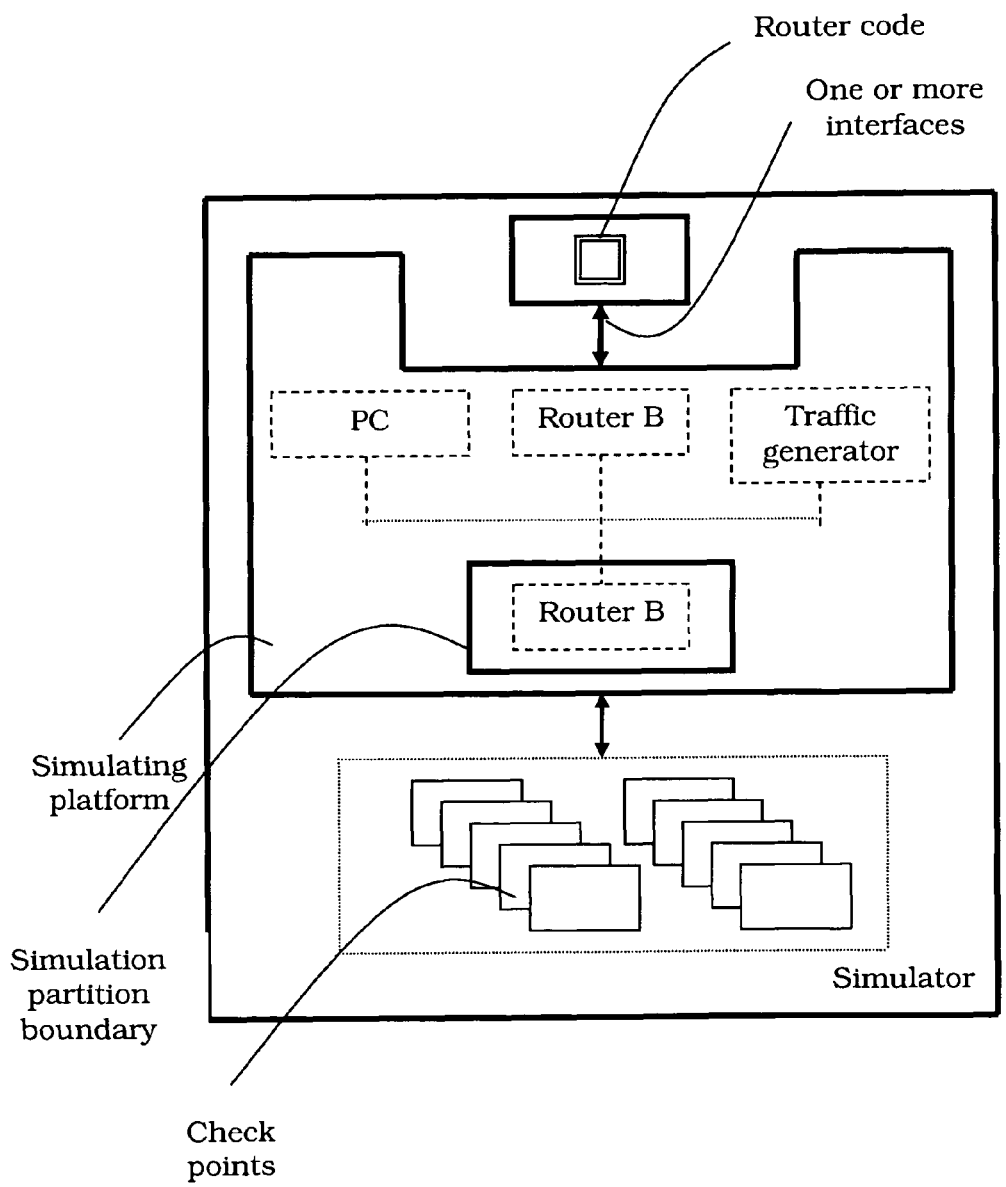

With regard to FIGS. 8A and 8B, in another example embodiment employing the method as discussed above and shown in FIGS. 2 and 3, two routers and partial reversal of the two routers are provided. In FIG. 8A there are two simulators, Simulator 1 and Simulator 2, which are connected to one another, for example, by wires or radio. However, a reversal of the complete simulated system need not be from the point of view of the user. Consider, for example, a model including the following components:

2 routers;

traffic generator; and

PC running router testing software.

If the user is interested in debugging router software, then the complete system may not be reversed. In particular if the state of the PC running the test software is larger (e.g., magnitudes larger) than that of the router. Example embodiments A (FIG. 8A) and B (FIG. 8B), which employ the method discussed above and shown in FIGS. 2 and 3.

In example embodiment A, two simulators are used. The first simulator simulates the first of the routers and the other simulator simulates the PC machine as well as the second router. Each simulator considers the other simulator to be outside of the simulation boundary and all, or substantially all, incoming traffic is recorded (e.g., TCP/IP traffic). This is similar to the previous case with routers in a live environment.

In example embodiment B, a single simulator is used. The simulator is equipped with the capability to simulate a selected part of the system (e.g. one of the routers) and/or the full system, forward in time. The simulator may have the capability to record incoming interaction from the rest of the system (for example, packets from the other router and the PC).

A target object in example embodiments of the present invention have been represented by router code, it will be understood that router code serves as a non-limiting example of the present invention.

In another example embodiment employing the method discussed above and shown in FIGS. 2 and 3, frontend integration is provided. Reverse execution of a simulation may be integrated with the frontend of a simulator, with relevant software debuggers and/or with other analyzing or debugging facilities normally available to the operator of the simulator.

An example embodiment of the present invention includes a method for the operator to turn on (or off) reverse execution support Moreover, the operator may be able to alter the frequency with which micro checkpoints are taken or change the algorithm which decides when a micro checkpoint is taken. According to an example embodiment a method may allow the operator to alter the scope of reversibility (the entire session, the last n cycles, etc.).

A frontend supporting reverse execution may include a subset of the following functions:
- support for running the simulation backward;
- support for running the simulation a fixed number of cycles backward;
- support for rewinding the simulation to a particular time without triggering any breakpoints, etc.;

The electronic system being simulated may contain at least one central processor unit and debugging software running on the processor.

A reverse execution capable software debugger may support the following features:
- instruction breakpoints;
- data breakpoints (watchpoints);
- device breakpoints;
- event breakpoints; and
- time breakpoints.

In example embodiments of the method for reverse execution, all, or substantially all, debugging features that are available during forward execution may be available during backward execution.

An example embodiment of reverse value tracking may include the method discussed above and illustrated in FIGS. 2 and 3. Reverse execution may provide various different software debugging strategies, in addition to those available in conventional software debugging, for example, reverse value tracking. In an example embodiment of reverse value tracking the origin of a particular value may be traced. For example, assume a user has noted that a parameter to a function has an incorrect value (e.g., the variable param below).

```
void function1(int param) {
...
}
```

A conventional debugging approach is determining where this parameter received the incorrect value. For example, sources of the error may include:
- a bug in the code that passed the parameter, the parameter is buggy;
- memory corruption which overwrote the correct parameter with a bogus value; and
- indirect memory corruption which overwrote some other variable which was used in the calculation of the parameter.

A bug in the code may be debugged using conventional debugging techniques, for example, with or without reverse value tracking. Memory corruption and indirect memory corruption bugs may be debugged more easily by applying reverse value tracking. For example, if the call function is:

```
static int q;
void function2(int a, int b){
int c, tmp;
tmp=a*q;
c=b+tmp;
function 1(c);
}
``` an example embodiment of reverse value tracking employing the method discussed above and shown in FIGS. 2 and 3 may be implemented by:

1) Deciding to track the origin of the parameter param, which is known to be incorrect. In example embodiments of the present invention, this is done by a user, however, it will be understood that this may also be done using an computer algorithm, or in any other suitable manner.

2) Running the simulation (e.g., within the simulator) in reverse to the point where the bogus value is the result of some other input operands, for example, stopping at the line "c=b+tmp;".

The user may inspect the value of both source operands in order to determine which one is incorrect and choose which input operand to continue tracking. For example, assuming that the variable tmp is incorrect, the user continues to track the tmp variable and the simulation stops at "tmp=a*q;".

The user may determine that the variable q contains an incorrect or bad value, and, assume that the origin of the bogus value of q was due to memory corruption. The user may also assume the memory corruption occurred in the following code invoked at a point prior to the call to function2.

```
void function3(int*p, int len) {
/*buggy*/int
int i;
for (i=0; i<=len; i++)
p[i]=0;
}
```

For example, assuming that the bug is an "off by one" error, that is, the correct code is:

```
void function3(int*p, int len) {
/*OK*/int
int i;
for (i=0; i<len; i++)
p[i]=0;
}
```

In this example, the array is located just prior to the variable q in memory such that the incorrectly indexed element in the array, p[len], is located at the same memory location as q. When the origin of q is tracked, for example, by a user, the simulation is stopped at the line p[i]=0; and it is the developer may realize that the index i is outside of a valid range of the array.

Example embodiments of reverse value tracking, according to the present invention may include the following:
- setting a breakpoint upon the variable being tracked. This may be a register breakpoint or a memory breakpoint. The type of breakpoint may be dependent upon how the variable is stored, for example, in a CPU register, in a memory location, etc.
- Running the simulation in reverse until the breakpoint is triggered.
- Identifying the source operands of the operation that changed the value that was protected with a breakpoint.
- Choosing which value to continue tracking and repeating the process. In example embodiments a user may choose the values to continue tracking, however, it will be understood that an algorithm or any other suitable manner may be used.

In another example embodiment of reverse value tracking, which may reduce assignments (e.g., simple assignments):

1. setting a breakpoint upon the variable being tracked. This breakpoint may be a register breakpoint or a memory breakpoint, and may depend on how the variable is stored, for example, in a CPU register, in a memory location, etc.
2. Running the simulation in reverse until the breakpoint is triggered.
3. Identifying the source operands of the operation that changed the value that was protected with a breakpoint.

4. Setting watch points on all, or substantially all, source operands and reversing the simulation a number (e.g., a limited number) of cycles. For example, if a source operand depends on a single operand (e.g.; an assignment), then this operand may be tracked instead of the original one.
5. Running the simulation forward to the break point in 2.
6. Choosing which value to continue tracking and repeating the process. In example embodiments a user may choose the values to continue tracking, however, it will be understood that an algorithm or any other suitable manner may be used.

Setting watch points on all, or substantially all, source operands and reversing the simulation may be useful to reduce assembly statements such as, for example, temporary storage of a variable in a register. For example, the following code (e.g., C-code), b=a, may produce the following assembly statements.

lwz r5,16(r1); cpu register r5=a
mr r3,r5; cpu register r3=r5
stw r3,20(r1); b=cpu register r3

The variable a is temporary stored in a CPU register. Rather than presenting the dependency "b originates from r3", the dependency "b originates from a" may be presented to the user. This conclusion may be drawn by automatic code inspection and/or from debugging information associated with the code. However, additional reverse execution of steps 4 and 5, as discussed immediately above, may also be used.

Another example embodiment for reverse value tracking according to the present invention may use the method discussed above and shown in FIGS. 2 and 3. In this example embodiment for reverse value tracking, all, or substantially all, dependencies are tracked, for example, simultaneously. For example, consider the following code:

static int var;
void function1(int a, int b) {
c=a+b;
}
void function2(void){
var=var+800;
function1(var, 100)
}
void function3(void) {
var=1234;
}

In this example embodiment, assuming that the simulation is stopped at the "c=a+b" statement, and that the user wants to know the origin of the value of the variable c, the reverse value tracking algorithm tracks each operand and produces, for example, a tree with the result.

Figure 9:
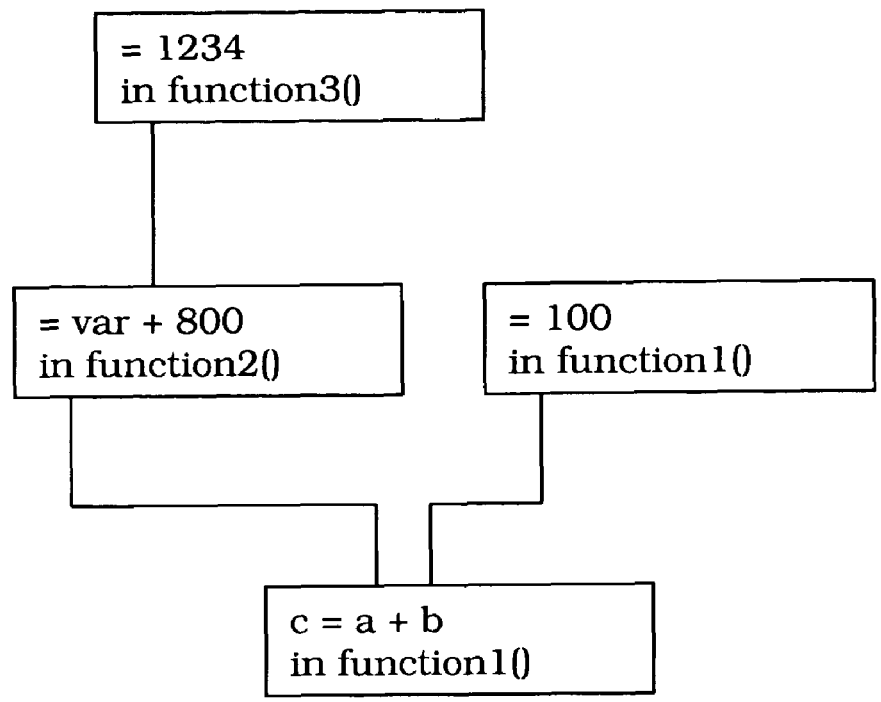
FIG. 9 illustrates an example of a tree used in an example embodiment of reverse value tracking, according to the present invention.

FIG. 9 illustrates an example of a tree, according to an this example embodiment of the present invention. In this example embodiment, function3 is invoked before function1 and the value of var used in function2 originates from this call.

In an example embodiment employing the method discussed above and shown in FIGS. 2 and 3, the user may choose to rewind the simulation to the cycle when a particular assignment in the tree took place, for example, using example embodiments for reverse value tracking as outlined above. That is, for example:

1. setting a breakpoint upon the variable(s) being tracked (e.g., CPU register, memory location, etc.).
2. Running the simulation in reverse until a breakpoint is triggered.
3. Recording the operation that triggered the breakpoint in the dependency tree.
4. Tracking the source operands of the operation that triggered the breakpoint instead of the destination operand.
5. Restarting the backward simulation (e.g., if there are no outstanding dependencies, and/or a limit has been reached), and repeating the process from step 1.

In another example embodiment of the present invention employing the method discussed above and shown in FIGS. 2 and 3, a reverse execution engine is based upon determinism. For example, if a user simulates forward to point B in simulated time, reverses the system to a previous point A, and simulates forward to simulated time B again, there may be no difference in the state of the simulation compared to the first time the simulation was at point B.

In example embodiments for reverse execution, states at B may differ in certain situations. For example:
The user has identified a variable with an incorrect value using reverse execution and wants to manually change the value and restart the (forward) simulation with the correct value in effect.
The user wants to change a simulation parameter, which may change the behavior of the simulator. For example, a particular code may be examined to determine if the code behaves differently when an instruction cache of a simulated processor is disabled.
The user may want to start over from a previous point in time and may not want recorded non-deterministic input (e.g., mouse movements) to be played back when the simulation continues from that point.

Example embodiments of the method for reverse execution, according to the present invention, may include:
i) turning off the playback of recorded events, for example, at the request of the user; and
ii) allowing the user to change a state of the simulation and/or a simulation parameter.

Another example embodiment of the method for reverse execution, employing the method discussed above and shown in FIGS. 2 and 3, may involve allowing simulation parameters, variables or other parameters change in, for example, a controlled, or any other suitable, manner. For example, the operator of the simulator wants to measure the latency between the point when a packet enters an ethernet router on an interface and the point when it is sent out on another interface. Moreover, he or she wants to do this measurement for different kinds of packets.

The user may instruct the simulator to run a portion of the simulation, for example, with different boundary conditions. In this example embodiment, the simulator may be instructed to run from a point A, which may be fixed, until the packet is emitted on the other interface. For example, the simulator may:
i) rewind the simulation to point A;
ii) alter the incoming packet (e.g., change its length, etc.);
iii) run forward until the packets is emitted;
iv) store a measurement or measurements and repeat the process.

Example embodiments of the present invention, using reverse execution techniques, may provide enhanced performance.

Another example embodiment, employing the method discussed above and shown in FIGS. 2 and 3, provides robustness testing. For example, a code segment (e.g., a specific function) run with different input parameters may detect a parameter combination causing misbehavior or malfunction.

In an example embodiment of the present invention, a device may comprise a conditional break point. For example, the user sets a breakpoint at point A conditional on at least one condition at point B. The simulation halts at point A when the condition is going to be satisfied at point B. For example, a breakpoint may be set on a procedure that inserts a record in a database, and stops when it is about to corrupt the database. In example embodiments of the present invention, a conditional breakpoint may be set at point B. When the conditional break point occurs it is removed and an unconditional breakpoint is set at point A. Execution is reversed to point A, the breakpoint is removed, and the conditional breakpoint at point B is re-instated.

For example, if the database is corrupt, point A is set at the start of the insert procedure and point B is set on the code that checks database consistency. When a record that will corrupt the database is about to be inserted, the execution halts and the user (e.g., programmer) may use the debugger determine a reason or reasons for the corruption.

Although example embodiments of the present invention have been discussed herein with regard to specific applications and/or implementations, it will de understood that example embodiments may be utilized in, for example, debugging or development of user level applications, debugging or development of multi-threaded software, debugging or development of system level software, hardware modeling, hardware debugging, hardware development, driver development, driver debugging, driver development, prototyped hardware driver development (i.e. for not yet physically existing hardware), and/or any other suitable area.

Example embodiments of the present invention provide the ability to run reverse, forward, and again reverse while reducing the risk of changing any variable or parameter in the simulation, either in the target object or in the models. In example embodiments of the present invention an execution of a simulation may be reversed in combination with its functional context, that is, activities may be repeated in order to determine that the reverse execution behaves in the same, or substantially the same, way. Example embodiments of the present invention may provide a fully reversible execution simulator or simulation. In example non-limiting embodiments 'fully', may be the reverse execution of part, all, or substantially all, of a hardware system, including CPUs, RAM and devices, that is, the state of the technical features in the system is controlled. If a bug occurs, it will occur again if the simulation is rerun.

In contrast to conventional virtual machine implementation, which may need software alterations (e.g., a modified kernel), which may limit the applicability, example embodiments of the present invention provide the usage of a fully reverse execution, which need not modify the software being run. For example, A fully reverse execution provides for reverse execution of multi-node systems, including coupled multi-processor systems and the like. In another example, fully reverse execution provides for reversing any workload on an arbitrary electronic system.

The notion of hardware models interfacing at least one functional interface of the at least one target object may provide that the reverse execution of the simulation will be full in the sense that the complete environment with which the target object interacts is under control. Thus, a fully reverse execution of a simulation when reversing time is possible due to that all, or substantially all, key interfaces that the at least one target object contacts are included in the reverse execution process. Thus the complete system, including, for example, devices, the operating system, is reversed.

In example embodiments of the present invention generating checkpoints as described above, leads to an improvement of performance. Further, generating a go to checkpoint provides an opportunity to more quickly and/or more easily to go to a checkpoint directly.

In example embodiments of the present invention, a micro checkpoint may be faster and/or easier to generate and/or may more effectively utilize resources.

In example embodiments of the present invention, allowing more than one state at a time may provide enhanced performance since it is possible to alternate between different futures from states of a specific point in simulated time.

In example embodiments of the present invention, partial checkpoints may provide partial reverse execution functionality.

Example embodiments of the present invention may include one or more simulation platforms, which may increase the flexibility of reverse execution, for example, by reversing more complex simulation.

In example embodiments of the present invention, a conditional breakpoint may provide a break point, which (e.g., may only break) breaks a simulation when at least one condition is fulfilled.

Although specific aspects may be associated with specific example embodiments of the present invention, as described herein, it will be understood that the aspects of the example embodiments, as described herein, may be combined in any suitable manner.

While example embodiments of the present invention have been particularly shown and described, it will be understood by those of ordinary skill in the art that various changes in form and details may be made therein without departing from the spirit and scope of the present invention as defined by the following claims.

The invention claimed is:

1. A device comprising:
a processor adapted to,
first restore a state of a preceding checkpoint relative to a current simulation position, the current simulation position being a point of interest in a simulation,
simulate the entire simulation forward from the preceding checkpoint by replaying recorded events and noting breakpoints or watch points regardless of breakpoints or watch points encountered while simulating from the preceding checkpoint to the current simulation position, the recorded events including non-deterministic events, and the simulating forward from the preceding checkpoint to the current simulation position having a same instruction flow as an initial simulation,
second restore the state of a last occurring breakpoint or watch point preceding the current simulation position, after reaching the current simulation position,
load the state of an earlier checkpoint; and
repeat the first restoring, the simulating, the noting, the second restoring, and the loading, if no breakpoint or watch point occurred between the preceding checkpoint and the current simulation position to form an iterative process in which successively earlier checkpoints are restored, the earlier checkpoint being prior to the preceding checkpoint in the simulation.

2. The device of claim 1, further including,
at least one target object;
a simulation platform, associated with the at least one target object, and including at least one hardware model for the simulation, the at least one hardware model modeling at least one functional interface relative to the at least one target objects, which present at least one functional interface relative to the simulation platform, the at least one hardware model interfacing the at least one functional interface of the at least one target object, and a plurality of checkpoints, each checkpoint representing a state of the simulation at least in terms of the at least one functional interface relative to the at least one target object and a point in time.

3. The device according to claim 1, wherein checkpoints are generated to note the breakpoints or watch points.

4. The device according to claim 1, wherein simulated points in time are noted to note the breakpoints or watch points.

5. The device according to claim 1, wherein the last occurring breakpoint or watch point is restored by,
loading the state of a preceding checkpoint, and
simulating forward to the breakpoint or watch point.

6. The device according to claim 1, wherein the last occurring breakpoint or watch point is restored by,
loading a state of a checkpoint corresponding to the breakpoint or watch point.

7. The device according to claim 1, wherein the processor generates a checkpoint.

8. The device according to claim 7, wherein the generating of a checkpoint by the processor further includes,
marking a memory page with an indicator,
copying the memory page,
adding the memory page to a preceding checkpoint, and
remarking the memory page with another indicator.

9. The device according to claim 7, wherein the generating of a checkpoint is prompted by the user.

10. The device according to claim 7, wherein the generating of a checkpoint is prompted by the processor.

11. The device according to claim 1, wherein, if a number of checkpoints is exceeded, the processor performs at least one of,
deleting a checkpoint,
merging checkpoints,
swapping checkpoints between a first and a second memory,
compressing checkpoints, and
stopping generating checkpoints.

12. The device according to claim 1, wherein the at least one target object includes at least one of one or more computer programs, electronic hardware, and a combination thereof.

13. The device according to claim 12, wherein the one or more computer programs include at least one of a client program, an application program, a driver, an operating system program, computer graphics display program, routing program, communication program, and BIOS.

14. The device according to claim 12, wherein the electronic hardware includes at least one of a processor, a bus, and a router.

15. The device according to claim 1, wherein the processor generates a go to checkpoint.

16. The device according to claim 15, wherein the processor skips forward to reinstating a state of go to checkpoint, after loading the state of an earlier checkpoint, or after a go to checkpoint.

17. The device according to claim 1, wherein the processor restores the state of the simulation at a simulated time by restoring a checkpoint preceding the simulated time, and running the simulation forward to the simulated time.

18. The device according to claim 2, further including a plurality of simulation platforms.

19. The device according to claim 2, further including a micro checkpoint, each micro checkpoint together with a current simulation state and preceding micro checkpoints representing a state of the simulation at a particular time at least in terms of a selection of the at least one functional interface relative to the at least one target object.

20. The device according to claim 2, further including a partial checkpoint representing a state of the simulation at least in terms of a selection of the at least one functional interface relative to the at least one target object and a point in time.

21. The device according to claim 2, wherein the processor allows more than one state at a point in time and the processor simulates forward based on an indication from a user.

22. The device according to claim 2, further including a conditional break point.

23. A software debugger including the device of claim 1.

24. A software development tool including the device of claim 1.

25. A system for tracing a value of a variable in a simulation including the device of claim 1, and further adapted to,
monitor one or more parameters of the simulation to be traced.

26. The device according to claim 25, wherein a user is prompted to indicate the one or more parameters.

27. A method for reverse execution of a simulation, the method comprising:
first restoring a state of a preceding checkpoint relative to a current simulation position, the current simulation position being a point of interest in the simulation;
simulating the entire simulation forward from the preceding checkpoint by replaying recorded events, regardless of breakpoints or watch points encountered while simulating from the preceding checkpoint to the current simulation position, the recorded events including non-deterministic events, and the simulating forward from the preceding checkpoint to the current simulation position having a same instruction flow as an initial simulation;
noting breakpoints or watch points;
second restoring a state of a last occurring breakpoint or watch point preceding the current simulation position when having reached the current simulation position;
loading the state of an earlier checkpoint; and
repeating the first restoring, the simulating, the noting, the second restoring, and the loading if no breakpoint or watch point occurred between the preceding checkpoint and the current simulation position to form an iterative process in which successively earlier checkpoints are restored, the earlier checkpoint being prior to the preceding checkpoint in the simulation.

28. The method according to claim 27, wherein the breakpoints or watch points are noted by generating checkpoints.

29. The method according to claim 27, wherein the breakpoints or watch points are noted by noting the simulated points in time.

30. The method according to claim 27, wherein the last occurring breakpoint or watch point is restored by,
loading the state of a preceding checkpoint, and
simulating forward to the breakpoint or watch point.

31. The method according to claim 27, wherein the last occurring breakpoint or watch point is restored by,
loading a state of a checkpoint corresponding the breakpoint or watch point.

32. The method according to claim 27, further including, generating a checkpoint.

33. The method according to claim 32, wherein a checkpoint is generated by,
marking a memory page with an indicator,
copying the memory page, adding the memory page to the preceding checkpoint, and remarking the memory page with another indicator.

34. The method according to claim 32, wherein the generating of a checkpoint is prompted by a user.

35. The method according to claim 32, wherein the generating of a checkpoint is prompted by the processor.

36. The method according to claim 27, wherein if a number of checkpoints is exceeded, at least one of,
   deleting a checkpoint,
   merging checkpoints,
   swapping checkpoints between a first and a second memory, compressing checkpoints, and
   stopping generating checkpoints is performed.

37. The method according to claim 27, wherein the at least one target object includes at least one of one or more computer programs, electronic hardware, and a combination thereof.

38. The method according to claim 37, wherein the one or more computer programs include at least one of a client program, an application program, a driver, an operating system program, computer graphic display program, routing program, communication program, and BIOS.

39. The method according to claim 37, wherein the electronic hardware includes at least one of a processor, a bus, and a router.

40. The method according to claim 27, further including, generating a go to checkpoint.

41. The method according to claim 40, further including, skipping forward to reinstating the state of the go to checkpoint after loading the state of an earlier checkpoint or after a go to checkpoint.

42. The method according to claim 27, further including restoring a state of a simulation at a simulated time by restoring a checkpoint preceding the simulated time, and running the simulation forward to the simulated time.

43. A device adapted to perform the method of claim 27, and further including,
   one or more simulation platforms.

44. The method according to claim 27, further including, generating micro checkpoints, each micro checkpoint together with a current simulation state and preceding micro checkpoints representing a state of the simulation at a particular time, at least in terms of a selection of at least one functional interface relative at least one target object.

45. The method according to claim 27, further including, generating a partial checkpoint, representing a state of the simulation at least in terms of a selection of at least one functional interface relative to at least one target object and a point in time.

46. The method according to claim 27, wherein more than one state is allowed at a point in time and forward simulation is based on an indication from a user.

47. The method according to claim 27, further including a conditional break point.

48. A software debugging method including the method of claim 27.

49. A software development support method including the method of claim 27.

50. The method for tracing a value of a variable in a simulation including the method of claim 27, and further including,
   monitoring one or more parameters of the simulation to be traced.

51. The method according to claim 50, further including, receiving an indication of the one or more parameters from a user.

52. A computer program product loadable into the internal memory of a computer, including software code portions, embodied on a computer readable medium, for causing a computer to perform the method of claim 27.

53. A computer program product loadable into the internal memory of a computer, including software code portions, embodied on a computer readable medium, for causing a computer to perform the method of claim 48.

54. A computer program product loadable into the internal memory of a computer, including software code portions, embodied on a computer readable medium, for causing a computer to perform the software development support method of claim 49.

55. A computer program product loadable into the internal memory of a computer, including software code portions, embodied on a computer readable medium, for causing a computer to perform the method of claim 50.

56. The apparatus of claim 1, wherein the breakpoints or watch points are noted without taking action.

57. The method of claim 27, wherein the noting of the breakpoints or watch points is performed without taking action.

* * * * *